United States Patent [19]
Mockenhaupt

[11] Patent Number: 5,375,851
[45] Date of Patent: Dec. 27, 1994

[54] MULTI-LAYER METAL GASKET WITH POSITIONING APERTURES AND METHOD OF MAKING SAME

[75] Inventor: Martin Mockenhaupt, Highland Park, Ill.

[73] Assignee: Fel-Pro Incorporated, Skokie, Ill.

[21] Appl. No.: 110,848

[22] Filed: Aug. 24, 1993

[51] Int. Cl.⁵ ............................................. F16J 15/08
[52] U.S. Cl. ..................................... 277/9; 277/235 B
[58] Field of Search ........... 277/232, 233, 234, 235 B, 277/236, 9, 166, 189; 29/513, 888.3

[56] References Cited

U.S. PATENT DOCUMENTS

| | | | |
|---|---|---|---|
| 1,985,473 | 12/1934 | Victor | 277/235 B |
| 4,519,619 | 5/1985 | Doyle | 277/235 B |
| 4,648,607 | 3/1987 | Yamada et al. | 277/235 B |
| 4,813,691 | 3/1989 | Schoenborn | 277/235 B |
| 5,022,431 | 6/1991 | Grey et al. | 277/235 B X |
| 5,083,801 | 1/1992 | Okano et al. | 277/235 B X |
| 5,121,933 | 6/1992 | Silvers | 277/235 B |
| 5,131,668 | 7/1992 | Uchida | 277/180 X |
| 5,330,200 | 7/1994 | Unseth | 277/9 |

FOREIGN PATENT DOCUMENTS 0500273  8/1992  European Pat. Off. ........ 277/235 B

*Primary Examiner*—William A. Cuchlinski, Jr.
*Assistant Examiner*—John L. Beres

[57] ABSTRACT

A multi-layer metal gasket having aligned positioning and preform openings, with segments of the preform opening closely abutting the positioning openings to prevent relative lateral movement of the layers and with tabs of the preform opening underlying one of the other gasket layers to prevent relative vertical movement. A method of making such a gasket is also disclosed.

7 Claims, 2 Drawing Sheets

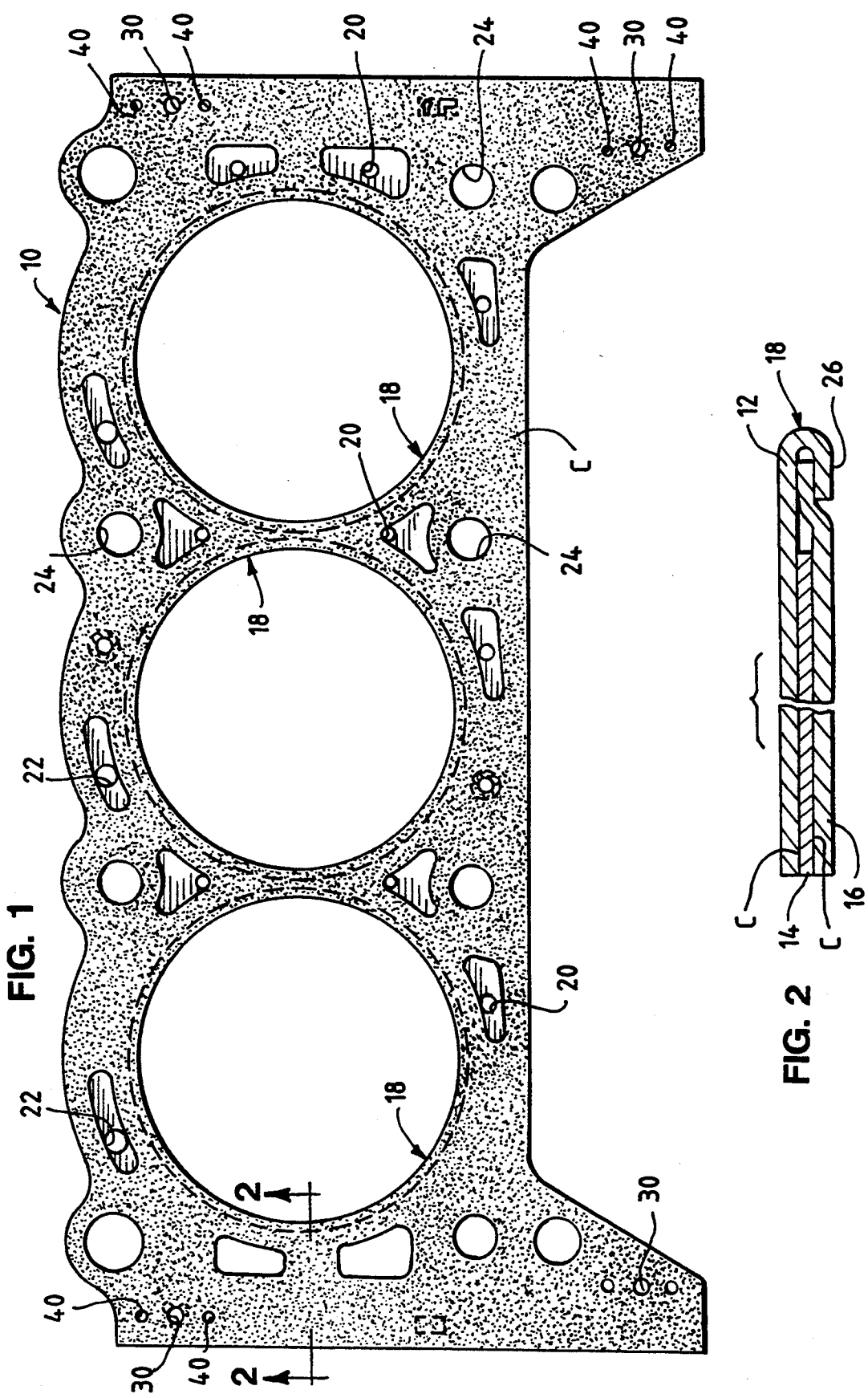

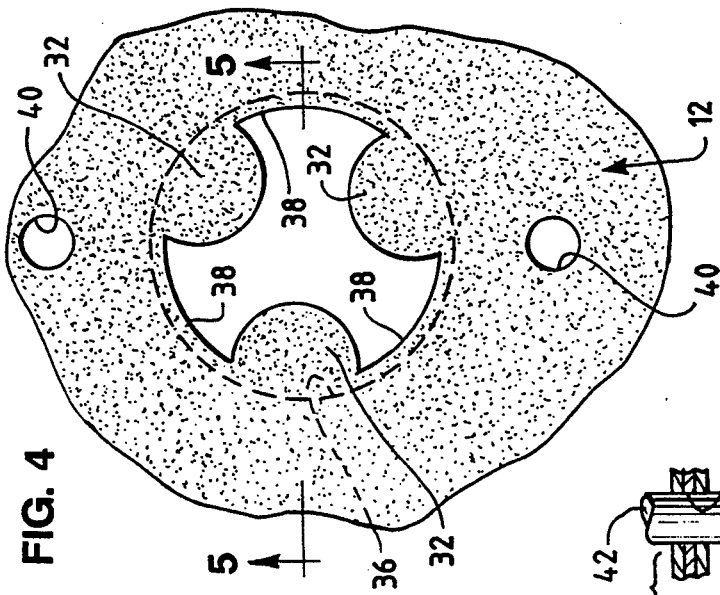
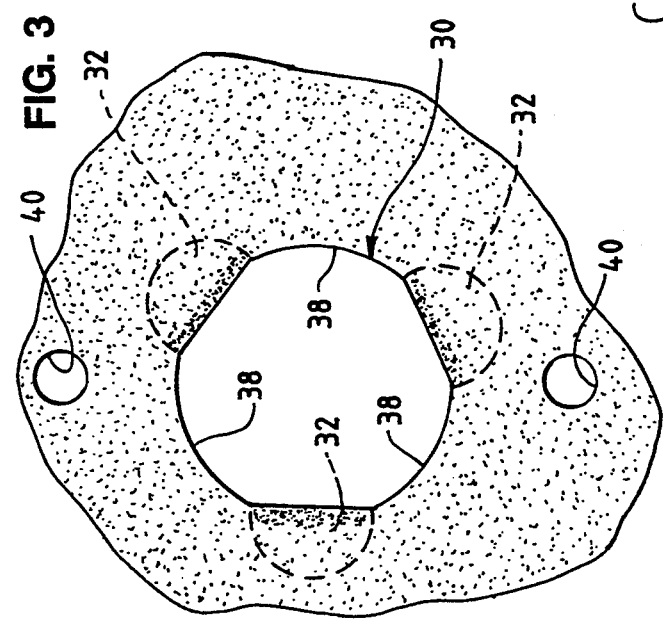
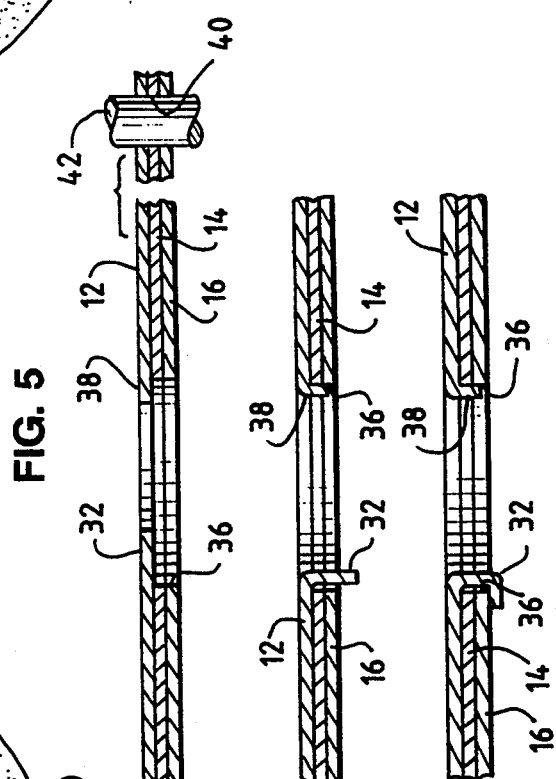
FIG. 3
FIG. 4
FIG. 5
FIG. 6
FIG. 7

MULTI-LAYER METAL GASKET WITH POSITIONING APERTURES AND METHOD OF MAKING SAME

BACKGROUND OF THE INVENTION

A variety of methods have been proposed for assembling multi-layer metal gaskets. In so doing, it is very important that they be precisely positioned relative to each other, and that those positions be maintained in use.

Under load, in use, there are substantial shear loads imposed on gaskets. Typical methods for securing the multiple layers of gaskets do not ensure against small movements between the layers.

Thus, it would be of advantage to provide a gasket and a method for making it which would both accurately position layers relative to each other in plan view, and also to maintain that accurate positioning in use.

SUMMARY OF THE INVENTION

In accordance with the present invention, a multi-layer metal gasket of improved accuracy of assembly and stability in use is provided. The gasket comprises a plurality of metal gasket layers having service openings and bolt holes and at least two positioning apertures. Each positioning aperture comprises a preform opening in one layer and positioning openings defined by the other layers. Tabs and segments are defined by the preform opening. The segments are disposed in the positioning openings in said other layers and confront and abut the edges of the positioning openings. The tabs confront the edges of the positioning openings and underlie one of the other gasket layers to restrain relative vertical movement of the layers. The segments abut the edges of the positioning openings over at least 50 percent of the perimeter thereof to prevent lateral movement of the layers relative to each other.

In a preferred form, the positioning openings are circular and the gasket also includes an assembly opening in each layer positioned adjacent each positioning aperture. The gasket has special application as a head gasket. Desirably the segments do not project below the other layers.

An improved method of assembling a multi-layer metal gasket in accordance with this invention comprises the steps of providing at least two gasket layers having service openings, a preform opening in one of the layers and positioning openings in the other of the layers, the preform opening defining a plurality of tabs and deformable segments between the tabs, aligning the gasket layers with their preform and positioning openings in alignment, deforming the tabs and the deformable segments of the preform opening into the positioning openings of the other layers and forcing the deformable segments into abutment with at least 50 percent of the edge of the positioning openings in the other layers, and forming the tabs under the other layers to clamp all of the layers together, whereby the tabs and deformed segments prevent vertical and lateral movement of the layers relative to each other.

Preferably each of the layers provide assembly openings adjacent the preform and positioning openings, and the method includes the further step of positioning locating pins in the assembly openings prior to deforming the tabs and segments.

Further objects, features and advantages of the present invention will become apparent from the following description, drawings and appended claims.

BRIEF DESCRIPTION OF THE DRAWINGS

FIG. 1 is a plan view of a head gasket assembled in accordance with the present invention;

FIG. 2 is an enlarged cross-sectional view taken along line 2—2 of FIG. 1;

FIG. 3 is an enlarged view of a portion of FIG. 1;

FIG. 4 is an enlarged view like FIG. 3, but prior to formation of the positioning apertures;

FIG. 5 is a cross-sectional view taken substantially along line 5—5 of FIG. 4;

FIG. 6 is a cross-sectional view like FIG. 5, after a forming operation; and

FIG. 7 is a cross-sectional view like FIG. 5, after a further forming operation.

DETAILED DESCRIPTION

Referring first to FIG. 1, a typical multilayer metal head gasket 10 for an internal combustion engine comprises two or more metal layers with appropriate service openings therethrough. In the embodiment illustrated, gasket 10 comprises three layers 12, 14 and 16 defining combustion openings 18, coolant openings 20, and oil openings 22. A plurality of bolt holes 24 are also provided.

The multiple layers are provided with thin, micro-sealing coatings C of a sealant, such as a nitrile rubber, to enhance sealing between the layers and against the head and block, all with known materials and in a conventional manner.

The combustion openings are armored, as by folded-over flanges 26 formed from one of the layers. Flanges 26 function in a known manner to assist in maintaining the layers 12, 14 and 16 in assembly.

At least two positioning apertures 30 are also provided. They are formed in accordance with the present invention. As seen in FIGS. 1, and as shown by FIGS. 3-7, apertures 30 are defined by one of the layers, such as layer 12, which has been formed to accurately combine and position the several layers of the gasket, and to restrain the layers 12, 14 and 16 from lateral and vertical movement.

To that end, each of the metal layers is first formed to its proper shape and with its appropriate openings and formations. Layer 12, at each of the positioning apertures 30, is formed to define a plurality of tabs 32, preferably at least three tabs 32, which may each occupy about 60 degrees or less of the preform opening 34 in layer 12. The preform opening 34 also has three deformable segments 38 which are disposed between tabs 32. The radius of the deformable preform opening 34 is approximately equal to the radii of each of the positioning openings 36 in layers 14 and 16 less the vertical height of the layers 14 and 16 in the zones of the segments 38.

When the layers are to be joined via the positioning apertures 30, the assembly illustrated by FIG. 4 is subjected to a forming operation which deforms and forces tabs 32 and segments 38 from the positions of FIGS. 4 and 5 to those of FIG. 6 in which the segments 38 are forced into a confronting abutting relationship with the edges defining the openings 36 in layers 14 and 16. Similarly, tabs 32 then closely confront the edges of the openings, particularly at their edges which adjoin segments 38. Preferably segments 38 are sized so that when they are formed, as shown, they do not project beyond the lower surface of the layer 16, hence do not interfere with the function of the lower surface of layer 16. The tabs are then further deformed to underlie the lowermost of the assembled layers, as seen in FIG. 7, thereby to clamp the layers together.

Although, as seen in FIG. 3, the tabs 32 do not as closely abut the edges of openings 36 as do the segments 38, it will be appreciated that there is close abutment between the formations provided by layer 12 at positioning apertures 30 by a substantial portion of the formations, in this case by at least about 50% (180 degrees) of the apertures 30 in the zones of the deformed segments 38.

It will be appreciated that the tabs serve to prevent relative vertical movement between the layers 12, 14 and 16. Further, the tabs 32 and formed segments 38 serve to prevent all lateral movement of the layers 12, 14 and 16 relative to each other. Such movement is prevented in use of the gasket, thereby resisting the tendency of the gasket layers to move in shear under engine load. Furthermore, the positioning apertures 30 serve to accurately position the layers 12, 14 and 16 relative to each other, thereby to provide a precision of relationship not otherwise readily obtainable.

To assist further in the precise positioning of the layers 12, 14 and 16 as they are assembled in the manner described, auxiliary locating or assembly openings 40 may be provided. A pair of assembly openings 40 are shown adjacent each aperture 30. Openings 40 are precisely located in each of the layers, and during forming of apertures 30 may be seated on locating pins 42, as illustrated by FIG. 5. Thus, as the positioning apertures 30 are formed, no relative movement of the layers 12, 14 and 16 is permitted, and the final formation of the apertures 30 provides the greatest precision of alignment possible.

In one form, a gasket may have a configuration as illustrated in FIG. 1, with openings of the relative dimensions there shown. Layers 12, 14 and 16 may be 0.012", 0.008", and 0.012" inch thick, and may be provided with microsealing rubber coatings C of a thickness of 0.001" on 12, 14 and 16. The positioning apertures may have positioning openings 36 in layers 14 and 16 of 0.197 inch diameter. The preform opening may have a dimension of 0.231 inch diameter at segments 38. The tabs 32 are proportioned such that after forming to the positions shown in FIG. 7 they extend under layer 16 by about 0.040" inch.

It will be apparent that more or less than three metal gasket layers may be assembled in the foregoing manner, such as two, four or five layers, all in a similar manner and with like precision in the final gaskets. Furthermore, even where plural layers are used in the final gasket, it is possible, where desired, to assemble two or more, but less than all of the layers in the manner described in some or all of the locations in which the positioning apertures are used. Thus, for example, where one outer layer of three layers is cut back, the same process may be used to assemble the two other layers at a desired positioning aperture.

Additionally, two tabs or more than three tabs may be used as long as plural spaced segments 38 are used, thereby to provide the precise positioning of gasket layers at the positioning apertures and to provide abutting contact around at least about 50 percent of the perimeter of the positioning aperture. And, although circular apertures 30 and openings 36 are preferred, apertures and openings of other shapes may be used as well, as long as the required abutting contact between segments 38 and the openings in the other layers provide abutting contact over at least about 50 percent of the perimeters or edges of the positioning openings in the other layers.

From the foregoing, it will be observed that numerous modifications and variations can be effected without departing from the spirit and scope of the present invention. It will be appreciated that the present disclosure is intended as an exemplification of the invention, and is not intended to limit the invention to the specific embodiments illustrated and described. The disclosure is intended to cover by the appended claims all such modifications as fall within the scope of the claims.

What is claimed is:

1. A multi-layer metal gasket comprising:

a plurality of metal gasket layers having service openings and bolt holes and having at least two positioning apertures;

each said positioning aperture comprising a preform opening in one layer and positioning openings defined by the other layers; and tabs and segments defined by said preform opening, said segments being disposed in said positioning openings in said other layers and confronting and abutting the edges of said positioning openings, and said tabs confronting the edges of said positioning openings and underlying one of said other gasket layers to restrain relative vertical movement of said layers, said segments abutting the edges of said positioning openings over at least 50 percent of the perimeter thereof to prevent lateral movement of said layers relative to each other.

2. A multi-layer metal gasket in accordance with claim 1, and wherein said positioning openings are circular.

3. A multi-layer metal gasket in accordance with claim 1, and further comprising an assembly opening in each layer positioned adjacent each positioning aperture.

4. A multi-layer metal gasket in accordance with claim 1, and wherein said service openings include at least one combustion opening and said gasket is a head gasket.

5. A multi-layer metal gasket in accordance with claim 4, and wherein said segments do not project below the other layers.

6. A method of assembling a multi-layer metal gasket, comprising the steps providing at least two gasket layers having service openings, a preform opening in one of said layers and positioning openings in the other said layers, said preform opening defining a plurality of tabs and deformable segments between said tabs;

aligning said gasket layers with their preform and positioning openings in alignment;

deforming said tabs and said deformable segments of said preform opening into the positioning openings of said other layers and forcing said deformable segments into abutment with at least percent of the edge of the positioning openings in the other layers; and forming said tabs under said other layers to clamp all of said layers together;

whereby said tabs and deformed segments prevent vertical and lateral movement of said layers relative to each other.

7. The method of claim 6, and wherein each of said layers provide assembly openings adjacent said preform and positioning openings, and the further step of positioning locating pins in said assembly openings prior to deforming said tabs and segments.

* * * * *

UNITED STATES PATENT AND TRADEMARK OFFICE
CERTIFICATE OF CORRECTION

PATENT NO. : 5,375,851
DATED      : December 27, 1994
INVENTOR(S) : Martin Mockenhaupt It is certified that error appears in the above-identified patent and that said Letters Patent is hereby corrected as shown below:

Claim 6, column 4, line 45, after "steps" insert --of:--.

Claim 6, column 4, line 56, after "least" insert --50--.

Signed and Sealed this

Fourth Day of April, 1995

Attest:

BRUCE LEHMAN

Attesting Officer    Commissioner of Patents and Trademarks